United States Patent
Zheng

(10) Patent No.: US 10,110,549 B2
(45) Date of Patent: Oct. 23, 2018

(54) METHOD, SERVER AND ELECTRONIC DEVICES OF SYNCHRONIZING NOTIFICATION MESSAGES FOR ELECTRONIC DEVICES

(71) Applicant: HUIZHOU TCL MOBILE COMMUNICATION CO., LTD., Huizhou (CN)

(72) Inventor: Yu Zheng, Huizhou (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 155 days.

(21) Appl. No.: 14/893,845

(22) PCT Filed: Feb. 15, 2015

(86) PCT No.: PCT/CN2015/073087
§ 371 (c)(1),
(2) Date: Nov. 24, 2015

(87) PCT Pub. No.: WO2015/169119
PCT Pub. Date: Nov. 12, 2015

(65) Prior Publication Data
US 2016/0105389 A1    Apr. 14, 2016

(30) Foreign Application Priority Data

May 7, 2014   (CN) .......................... 2014 1 0190612

(51) Int. Cl.
*G06F 15/16*   (2006.01)
*H04L 12/58*   (2006.01)
*H04L 29/06*   (2006.01)

(52) U.S. Cl.
CPC .............. *H04L 51/36* (2013.01); *H04L 51/04* (2013.01); *H04L 51/043* (2013.01); *H04L 51/14* (2013.01);
(Continued)

(58) Field of Classification Search
CPC .... H04L 51/043; H04L 63/12; H04L 65/1093
See application file for complete search history.

(56) References Cited

U.S. PATENT DOCUMENTS 9,325,644 B2 * 4/2016 Douglas ................ H04L 51/043
2005/0031094 A1   2/2005 Gilbert
(Continued)

FOREIGN PATENT DOCUMENTS

CN   103442344 A   12/2013
CN   103957150 A   7/2014
(Continued)

OTHER PUBLICATIONS

Amendment to Non-Final Office action dated Dec. 20, 2017, for U.S. Appl. No. 14/894,280, filed Nov. 25, 2015, Title: Method of Synchronizing Notification Messages for Electronic Devices and Lectronic Devices.

*Primary Examiner* — Kyung H Shin
(74) *Attorney, Agent, or Firm* — Shimokaji IP

(57) ABSTRACT

A method of synchronizing notification messages for electronic devices may include monitoring if an electronic device has a notification message. If the electronic device has a notification message, the method may include determining if the electronic device is on standby. If the electronic device is determined to be on standby, a notification message may be sent via a server to an active electronic device associated with the electronic device. An associated server and an electronic device are also provided. The (Continued)

methods, servers and electronic devices may facilitate gathering of notification messages.

17 Claims, 2 Drawing Sheets

(52) U.S. Cl.
CPC .............. *H04L 51/24* (2013.01); *H04L 63/12* (2013.01); *H04L 65/1093* (2013.01)

(56) References Cited

U.S. PATENT DOCUMENTS

| | | | |
|---|---|---|---|
| 2007/0058658 | A1 | 3/2007 | Ruckart |
| 2010/0029250 | A1 | 2/2010 | Gupta |
| 2011/0173323 | A1 | 7/2011 | Fimbel et al. |
| 2011/0258682 | A1* | 10/2011 | Yin .......................... H04L 63/12 726/3 |
| 2013/0215213 | A1* | 8/2013 | Power ...................... H04N 7/15 348/14.02 |
| 2014/0005809 | A1 | 1/2014 | Frei et al. |

FOREIGN PATENT DOCUMENTS

| | | |
|---|---|---|
| CN | 103973786 A | 8/2014 |
| EP | 2725768 A1 | 4/2014 |

\* cited by examiner

METHOD, SERVER AND ELECTRONIC DEVICES OF SYNCHRONIZING NOTIFICATION MESSAGES FOR ELECTRONIC DEVICES

TECHNICAL FIELD

The present disclosure relates to the field of mobile communication technologies. More specifically, the present disclosure relates to a method, a server and an electronic device for synchronizing notification messages for electronic devices.

BACKGROUND

As multimedia electronic devices (e.g. cell phones, PDAs, personal computers, etc.) have become more popular over recent years, a number of multimedia electronic devices owned by one person at the same time becomes increasingly high. As sizes of multimedia electronic devices become increasingly large, it is impossible for one person to carry a large number of multimedia electronic devices. On the other hand, when each multimedia electronic device has more and more functions, some multimedia electronic devices are not suitable to be used as auxiliary devices to other multimedia electronic devices, except for a limited number of wearable multimedia electronic devices.

As a result, messages that one person receives may show up on a plurality of multimedia electronic devices. Thus, the person cannot conveniently gather and promptly know the messages. For example, when a user holds a tablet to browse webpages or make online purchases, IM (instant messages) and text messages on a cell phone cannot be viewed immediately and directly. The user must turn to the cell phone to view the instant messages and text messages. In some environments, moreover, a user may even be unable to immediately locate where his/her cell phone is, for example, when the cell phone is in another room.

SUMMARY

To solve the above problems of the prior art, the object of the present invention is to provide a method, a server and an electronic device of synchronizing notification messages for electronic devices such that a user can promptly receive notification messages.

A method of synchronizing notification messages for electronic devices includes monitoring if an electronic device has a notification message; if the electronic device has the notification message, determining if the electronic device is on standby; the electronic device submits a display request for the notification message to the server, wherein the display request carries the notification message and a message identifier; determining if the display request has been processed by the server during a first preset wait period; if the display request is determined to have been processed by the server during the first preset wait period, the server determines if an active electronic device is present; and if the server determines that the active electronic device is present, the server sends the notification message, according to the message identifier, to the active electronic device; wherein, if the electronic device is active, the electronic device displays the notification message.

In another embodiment, a method of synchronizing notification messages for electronic devices includes if it is determined that a display request has not been processed by the server during a first preset wait period, the electronic device displays a notification message.

In a further embodiment, a method of synchronizing notification messages for electronic devices includes if the server determines that an active electronic device is not present, the electronic device receives a message returned by a server that execution of the display request fails.

In yet another embodiment, a method of synchronizing notification messages for electronic devices includes determining if a user has viewed a notification message displayed by an active electronic device during a second preset wait period; if a confirmation message, returned by a server that the displayed notification message has been viewed by the user, is received during the second preset wait period, determining that the user has viewed the displayed notification message.

In yet a further embodiment, a method of synchronizing notification messages for electronic devices includes if a confirmation message returned by a server that a notification message has been displayed is received during a second preset wait period, determining that a user has not viewed the displayed notification message.

In another embodiment, an electronic device includes a monitoring module configured to monitor if an electronic device has a notification message; a determining module configured to, if the monitoring module determines that the electronic device has the notification message, determine if the electronic device is on standby; a sending module configured to send a message; wherein, if the determining module determines that the electronic device is on standby, the sending module sends the notification message via a server to an active electronic device associated with the electronic device.

In another embodiment, an electronic device includes a display module configured to display a message; wherein, if a determining module determines that the electronic device is active, the determining module displays the notification message.

In a further embodiment, an electronic device includes a control module configured to control a sending module to submit a display request for a notification message to a server; determine if the display request has been processed by the server during a first preset wait period; wherein, the display request carries the notification message and a message identifier; if the control module determines that the display request has been processed by the server during the first preset wait period, the server determines if an active electronic device is present; if the server determines that the active electronic device is present, the server sends the notification message, according to the message identifier, to the active electronic device.

In yet another embodiment, if a control module determines that a display request has not been processed by a server during a first preset wait period, a display module displays a notification message.

In yet a further embodiment, an electronic device includes a receiving module configured to receive a message; wherein, if a server determines that an active electronic device is not present, the receiving module receives a message returned by the server that an execution of the display request has failed.

In another embodiment, an electronic device includes a receiving module configured to receive a message; a control module configured to determine if a user has viewed a notification message displayed by an active electronic device during a second preset wait period; wherein, if the receiving module receives a confirmation message, returned by a server that the displayed notification message has been viewed by the user during the second preset wait period, the control module determines that the user has viewed the displayed notification message.

In another embodiment, if a receiving module receives a confirmation message returned by a server that a notification message has been displayed during a second preset wait period, a control module determines that the user has not viewed the displayed notification message.

In a further embodiment, an electronic device includes a control module configured to determine if the electronic device is active; a sending module configured to send a message; a receiving module configured to receive a message; wherein, if the control module determines that the electronic device is active, the sending module sends an active message that carries a message identifier to a server; the receiving module receives a notification message of a standby electronic device associated with the electronic device sent by the server according to the message identifier.

In yet another embodiment, an electronic device includes a display module configured to display a notification message.

In yet a further embodiment, a control module is further configured to time the second preset wait period and determine if the user has viewed the notification message displayed by the display module; if the control module determines that the user has viewed the displayed notification message, then control module determines if the second preset wait period has passed; if the control module determines that the second preset wait period has not passed, the control module controls the sending module to send a confirmation message that the displayed notification message has been viewed by the user to the server.

In another embodiment, a control module determines that a second preset wait period has passed, the control module controls the sending module to send a confirmation message that the notification message has been displayed to the server.

In a further embodiment, a server includes a receiving module configured to receive a display request submitted by a standby electronic device, wherein the display request carries a notification message and a message identifier; a control module configured to time a first preset wait period and determine if the display request has been received and processed; if the control module determines that the display request has been received and processed, then the control module determines if the first preset wait period has passed; if the control module determines that the first preset wait period has not passed, the control module determines if an active electronic device is present; and a sending module configured to, if the control module determines that the active electronic device is present, send the notification message, according to the message identifier, to the active electronic device.

In yet another embodiment, if a control module determines that a first preset wait period has passed, a standby electronic device displays a notification message.

In yet a further embodiment, if a control module determines that an active electronic device is not present, a sending module returns a message that an execution of a display request fails to a standby electronic device.

The method, the server and the electronic device for synchronizing notification messages for electronic devices according to the present invention facilitate gathering of notification messages such that a user can promptly receive notification messages.

BRIEF DESCRIPTION OF THE DRAWINGS

The above and other aspects, features and advantages of examples of the present invention will become clearer through the description below with reference to the accompanying drawings, wherein.

DETAILED DESCRIPTION

Exemplary embodiments of the present invention are described in detail below with reference to the accompanying drawings. However, the present invention may be implemented in numerous different forms, and the present invention shall not be construed to be limited by the exemplary embodiments set forth herein. To the contrary, the provision of these examples is to explain the principles and actual applications of the present invention, such that others skilled in the art can understand various examples and various modifications applicable for specific expected applications of the present invention.

In the accompanying drawings, the same legends are used to represent the same components. It should be understood that, although terms such as "first", "second" and "third" may be used to describe various components herein, those components shall not be limited by these terms. These terms are used only to differentiate one component from the other component. Electronic devices may include any proper type of mobile and immobile devices. Examples of immobile devices may include desktop computers, household appliances having information displays or prompt functions, household electronic entertainment devices or other similar devices. Examples of mobile devices may include mobile terminals, such as video phones, mobile phones, smart phones, International Mobile Communication System 2000 (IMT-2000) terminals, WCDMA terminals, UMTS terminals, PDAs, PMPs, DMB terminals, E-books, laptops, tablets, wearable devices, digital cameras, digital photo frames, etc.

Figure 1:
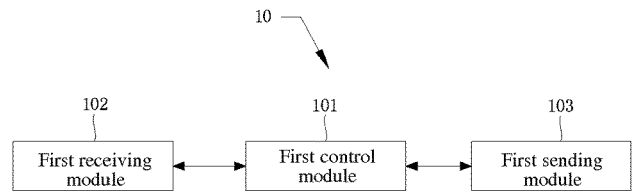
FIG. 1 depicts a block diagram of an example server according to the present invention.

Turning to FIG. 1, a block diagram of a server 10 may include a first control module 101, a first receiving module 102, and a first sending module 103. The first control module 101 may be configured to provide services of ID management and message management for electronic devices. For example, the first control module 101 may be configured to manage registered electronic devices, dynamic ID and status of electronic devices, etc. Specifically, the first control module 101 may receive registration from at least two electronic devices (e.g., the electronic device 20 in FIG. 2 and the electronic device 30 in FIG. 3). According to a unique identifier provided by each electronic device during registration, the first control module 101 may associate the electronic devices that use a same unique identifier, and may form an electronic device set. In other words, the first control module 101 may associate electronic devices that use the same unique identifier. Moreover, the first control module 101 may manage and maintain a list of active electronic devices for this electronic device set. For example, according to the unique identifier provided by the electronic device 20 and the electronic device 30, the first control module 101 may associate the electronic device 20 and the electronic device 30 that use the same unique identifier, and may form an electronic device set. In other words, the first control module 101 may associate the electronic device 20 and the electronic device 30 that use the same unique identifier.

In addition, the first control module 101 may assign a simplified unique identifier to each electronic device that requests registration, the simplified unique identifier may be used as an ID identifier of an electronic device during communications. For example, the first control module 101 may assign a simplified unique identifier to each of the electronic device 20 and the electronic device 30 that request registration. The simplified unique identifier may be an identifier of the same type as the unique identifier used by the electronic device during registration with the first control module 101, or may be an identifier of any other form and/or format that is assigned by the first control module 101 to an electronic device and can be identified and understood by the first control module 101, to which there is no specific limitation.

In addition, the first control module 101 may further manage an electronic device's active status (i.e. manage the electronic device in a status of being operated by a user, manage the screen of the electronic device while turned on) and standby status (i.e. the electronic device is in a status of not being operated by a user, e.g. the screen of the electronic device is turned off). For example, when the first control module 101 receives an active notification message sent from the electronic device 30, the first control module 101 may add the electronic device 30 into the list of active electronic devices managed thereby according to the message identifier (e.g. the message identifier may be the unique identifier used by the electronic device 30 during registration with the first control module 101, or may be the simplified unique identifier assigned by the first control module 101 to the electronic device 30) carried in an active notification message. When the first control module 101 receives a standby notification message sent from the electronic device 30, the first control module 101 may delete the electronic device 30 from the list of active electronic devices managed thereby according to the message identifier (e.g. the message identifier may be the unique identifier used by the electronic device 30 during registration with the first control module 101, or may be the simplified unique identifier assigned by the first control module 101 to the electronic device 30) carried in a standby notification message.

The first receiving module 102 may be configured to receive a message. For example, when the electronic device 20 determines that it is in a standby status itself, the first receiving module 102 may be used to receive a display request submitted by the standby electronic device 20. The display request may carry the notification message and the message identifier that the standby electronic device 20 has. For example, the message identifier may be a unique identifier used by the electronic device 20 during registration with the first control module 101, or may be a simplified unique identifier assigned by the first control module 101 to the electronic device 20.

The first control module 101 may be further configured to time a first preset wait period and determine if a display request has been received and processed. If the first control module 101 determines that the display request has been received and processed, then the first control module 101 may determine if the first preset wait period has passed. If the first control module 101 determines that the first preset wait period has not passed, the first control module 101 may determine if an active electronic device is present in the list of active electronic devices managed thereby. The first sending module 103 may be used to send a message. For example, if the first control module 101 determines that an active electronic device is present in the list of active electronic devices managed thereby, the first sending module 103 may send the notification message to the active electronic device according to the message identifier.

In addition, if the first control module 101 determines that the first preset wait period has passed, the first sending module 103 may send the message that the first control module 101 has not processed the display request to the standby electronic device, and thus the standby electronic device may display the notification message. In addition, if the first control module 101 determines that an active electronic device is not present in the list of active electronic devices managed thereby, the first sending module 103 may send a message that execution of the display request fails to the standby electronic device, and thus the standby electronic device may display the notification message.

The electronic device 20 and the electronic device 30 are described in detail below with reference to FIG. 2 and FIG. 3, respectively.

Figure 2:
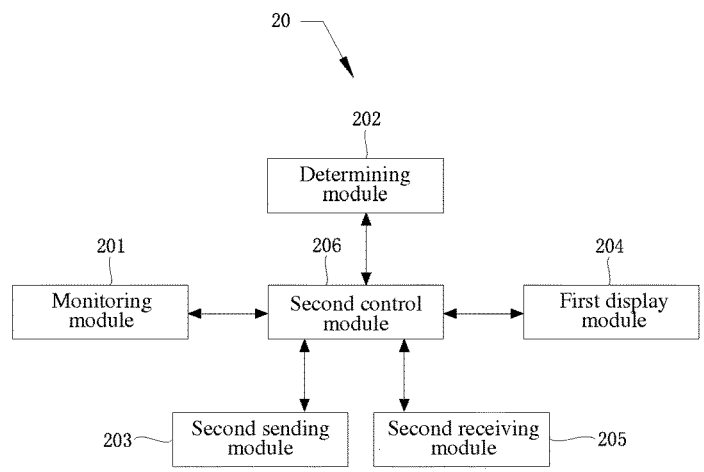
FIG. 2 depicts a block diagram of an example electronic device according to the present invention.

With reference to FIG. 2, a block diagram of an electronic device 20 may include a monitoring module 201, a determining module 202, a second sending module 203, a first display module 204, a second receiving module 205 and a second control module 206. Referring further to FIG. 1 and FIG. 2, the second control module 206 may use a unique identifier (e.g. a device identifier) of the electronic device 20 to register with the first control module 101 so as to obtain a simplified unique identifier assigned by the first control module 101. Moreover, the first control module 101 may associate the electronic device 20 and other electronic devices (e.g. the electronic device 30 uses the unique identifier shown in FIG. 3) that use the same unique identifier, and may form an electronic device set. In other words, the first control module 101 may associate the electronic device 20 and other electronic devices that use the same unique identifier. In addition, the first control module 101 may assign a simplified unique identifier to the electronic device 20 that requests registration, and the simplified unique identifier may be used as the ID identifier of the electronic device 20 during communications. The simplified unique identifier may be an identifier of the same type as the unique identifier used by the electronic device 20 during registration with the first control module 101, or may be an identifier of any other form and/or format that is assigned by the first control module 101 to the electronic device 20 and can be identified and understood by the first control module 101, to which there is no specific limitation.

In addition, when the first display module 204 is in an active status (e.g., the first display module 204 may be a touchscreen, and its active status refers to a status that the touchscreen is turned on or being touched, or a status that other components with human-machine interaction functions on the electronic device 20 are working, or a status that other screens connected with the electronic device 20 in a physical or wireless way are turned on or being used), the second sending module 203 may send an active notification message to the first control module 101. In response, the first control module 101 may add the electronic device 20 into a list of active electronic devices managed thereby according to the message identifier (e.g. the message identifier may be the unique identifier used by the electronic device 20 during registration with the first control module 101, or may be the simplified unique identifier assigned by the first control module 101 to the electronic device 20) carried in the active notification message. When the first display module 204 is in a standby status (e.g., a status such as the screen is turned off), the second sending module 203 may send a standby notification message to the first control module 101, and the first control module 101 may delete the electronic device 20 from the list of active electronic devices managed thereby according to the message identifier (e.g. the message identifier may be the unique identifier used by the electronic device 20 during registration with the first control module 101, or may be the simplified unique identifier assigned by the first control module 101 to the electronic device 20) carried in the standby notification message.

The monitoring module 201 may be configured to monitor if the electronic device 20 has a notification message. The notification message herein may be, for example, a call reminder, an IM (instant message), a text message, a message prompt from an auxiliary device, a call prompt from other devices, a message of electronic device status alarm or a message of electronic device application prompt, etc. If the monitoring module 201 monitors that the electronic device 20 has the notification message, the determining module 202 may determine if the first display module 204 is in a standby status.

The first display module 204 may be configured to display a message. For example, if the determining module 202 determines that the first display module 204 is in an active status, the first display module 204 may display the notification message. The second sending module 203 may be configured to display a message. If the determining module 202 determines that the first display module 204 is in a standby status, the second control module 206 may control the second sending module 203 to submit a display request for the notification message to the first receiving module 102 of the server 10. The display request may carry the notification message and a message identifier.

The second control module 206 may determine if the display request has been processed by the first control module 101 of the server 10 during a first preset wait period. If the second control module 206 determines that the display request has been processed by the first control module 101 of the server 10 during the first preset wait period, the first control module 101 may determine if an active electronic device is present in the list of active electronic devices managed thereby. If the first control module 101 determines that an active electronic device is present in the list of active electronic devices managed thereby, the first sending module 103 of the server 10 may send the notification message to the active electronic device according to the message identifier. In addition, if the second control module 206 determines that the display request has not been processed by the first control module 101 of the server 10 during the first preset wait period, the first display module 204 may display the notification message.

The second receiving module 205 may be configured to receive a message. If the first control module 101 determines that an active electronic device is not present in the list of active electronic devices managed thereby, the second receiving module 205 may receive a message returned by the first sending module 103 of the server 10 that the execution of the display request fails, and thus the first display module 204 may display the notification message. The second control module 206 of the electronic device 20 may further determine if the user has viewed the notification message displayed by the active electronic device during a second preset wait period. If the second receiving module 205 receives a confirmation message returned by the first sending module 103 of the server 10 that the displayed notification message has been viewed by the user during the second preset wait period, the second control module 206 may determine that the user has viewed the displayed notification message. If the second receiving module 205 receives a confirmation message returned by the first sending module 103 of the server 10 that the notification message has been displayed during the second preset wait period, the second control module 206 may determine that the user has not viewed the displayed notification message.

Figure 3:
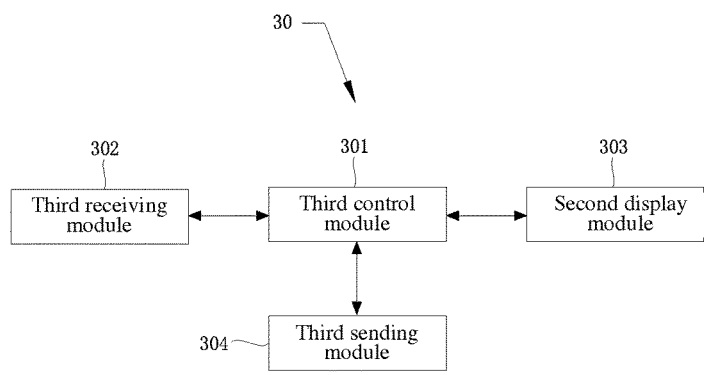
FIG. 3 depicts a block diagram of an example electronic device according to the present invention.

Turning to FIG. 3, a block diagram of an electronic device may include a third control module 301, a third receiving module 302, a second display module 303 and a third sending module 304. Referring further to FIG. 1 and FIG. 3, the third control module 301 may use the unique identifier (e.g. a device identifier) of the electronic device 30 to register with the first control module 101 so as to obtain a simplified unique identifier assigned by the first control module 101. Moreover, the first control module 101 may associate the electronic device 30 and other electronic devices (e.g. the electronic device 20 uses the unique identifier shown in FIG. 2) that use the same unique identifier, and may form an electronic device set. In other words, the first control module 101 may associate the electronic device 30 and other electronic devices that use the same unique identifier. In addition, the first control module 101 may assign a simplified unique identifier to the electronic device 30 that requests registration, and the simplified unique identifier may be used as the ID identifier of the electronic device 30 during communications. The simplified unique identifier may be an identifier of the same type as the unique identifier used by the electronic device 30 during registration with the first control module 101, or may be an identifier of any other form and/or format that is assigned by the first control module 101 to the electronic device 30 and can be identified and understood by the first control module 101, to which there is no specific limitation.

In addition, when the second display module 303 is in an active status (e.g., the second display module 303 may be a touchscreen, and its active status refers to a status that the touchscreen is turned on or being touched, or a status that other components with human-machine interaction functions on the electronic device 30 are working), the third sending module 304 may send an active notification message to the first control module 101, the first control module 101 may add the electronic device 30 into a list of active electronic devices managed thereby according to the message identifier (e.g. the message identifier may be the unique identifier used by the electronic device 30 during registration with the first control module 101, or may be the simplified unique identifier assigned by the first control module 101 to the electronic device 30) carried in the active notification message. When the second display module 303 is in a standby status (e.g., a status such as the screen is turned off), the third sending module 304 may send a standby notification message to the first control module 101, and the first control module 101 may delete the electronic device 30 from the list of active electronic devices managed thereby according to the message identifier (e.g. the message identifier may be the unique identifier used by the electronic device 30 during registration with the first control module 101, or may be the simplified unique identifier assigned by the first control module 101 to the electronic device 30) carried in the standby notification message.

The third control module 301 may be configured to determine if the second display module 303 is in an active status. The third receiving module 302 may be configured to receive a message. The second display module 303 may be configured to display a message. The third sending module 304 may be configured to send a message. Specifically, if the third control module 301 determines that the second display module 303 is in an active status, the third sending module 304 may send an active message that carries the message identifier to the first control module 101. The third receiving module 302 may receive a notification message of a standby electronic device associated with the electronic device 30 sent by the first sending module 103 of the server 10 according to the message identifier. The second display module 303 may display the notification message.

The third control module 301 of the electronic device 30 may further time a second preset wait period, and may determine if the user has viewed the notification message displayed by the second display module 303. If the third control module 301 determines that the user has viewed the notification message displayed by the second display module 303, then the third control module 301 may determine if the second preset wait period has passed. If the third control module 301 determines that the second preset wait period has not passed, the third control module 301 may control the third sending module 304 to send a confirmation message that the displayed notification message has been viewed by the user to the first receiving module 102 of the server 10. If the third control module 301 determines that the second preset wait period has passed, the third control module 301 may control the third sending module 304 to send a confirmation message that the notification message has been displayed by the second display module 303 to the first receiving module 102 of the server 10.

Figure 4:
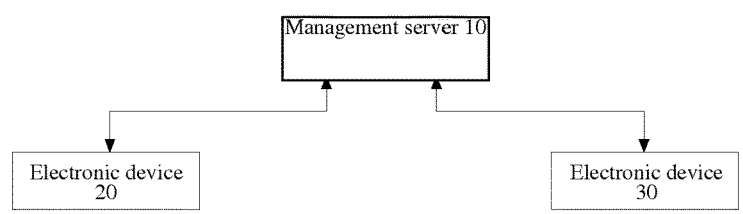
FIG. 4 illustrates example communications between a server and an electronic device according to the present invention.
Figure 5:
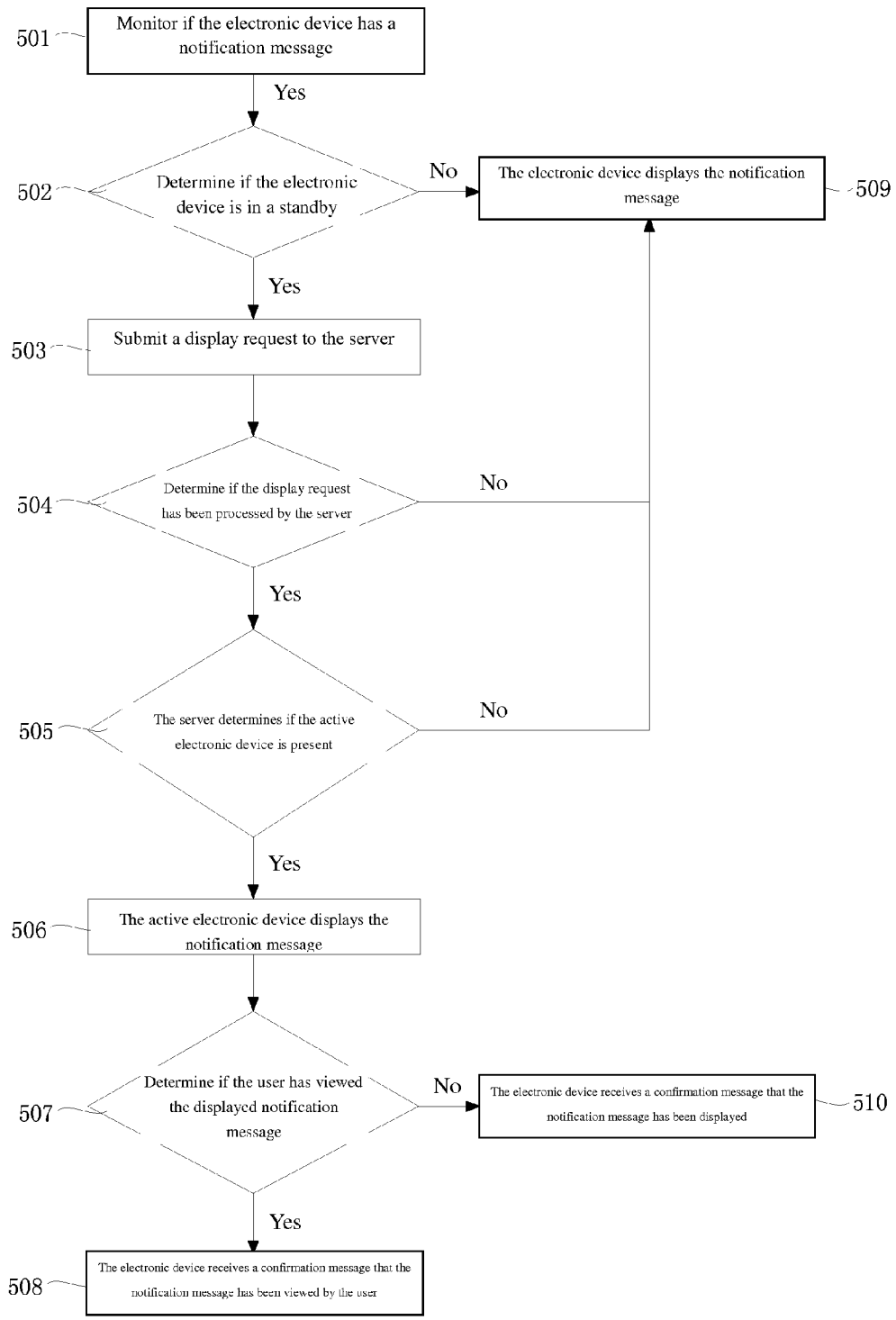
FIG. 5 depicts a flow chart of an example method of synchronizing notification messages for electronic devices according to the present invention.

With reference to FIG. 4, communications between a server and an electronic device are illustrated. Turning to FIG. 5, a flow chart of a method of synchronizing notification messages for electronic devices is depicted. Referring further to FIG. 4, the synchronization of notification messages for electronic devices may be carried out among the server 10, the electronic device 20 and the electronic device 30. However, it should be understood that the synchronization of notification messages for electronic devices may be carried out among the server 10, more electronic devices 20 and more electronic devices 30, or may be carried out among the server 10 and at least two electronic devices 20. In addition, the server 10 may be inside an electronic device. For example, the server 10 may be inside the electronic device 20 or the electronic device 30. In addition, the electronic device 20 and the electronic device 30 may be combined to form one electronic device.

Referring further to FIG. 1 and FIG. 4, prior to implementation of the method of synchronizing notification messages for electronic devices, the electronic device 20 and the electronic device 30 may use unique identifiers (e.g. a device identifier) of their own, respectively, to register with the first control module 101, so as to obtain a simplified unique identifier assigned by the first control module 101, respectively. In such a way, the first control module 101 may associate the electronic device 20 and the electronic device 30 that use the same unique identifier, and may form an electronic device set. In addition, the simplified unique identifier may be used as the ID identifier of each electronic device during communications. The simplified unique identifier herein may be an identifier of the same type as the unique identifier used by each electronic device during registration with the identification and association module 101, or may be an identifier of any other form and/or format that is assigned by the identification and association module 101 to each electronic device and can be identified and understood by the identification and association module 101, to which there is no specific limitation.

Referring further to FIG. 1 through FIG. 5, the monitoring module 201 may monitor if the electronic device 20 has a notification message (block 501). The notification message may be, for example, a call reminder, an IM (instant message), a text message, a message prompt from an auxiliary device, a call prompt from other devices, a message of electronic device status alarm or a message of electronic device application prompt, etc. If the monitoring module 201 monitors that the electronic device 20 has a notification message, the method may advance to block 502.

The determining module 202 may determine if the first display module 204 is in a standby status (block 502). If the determining module 202 determines that the first display module 204 is in a standby status, the method may advance to block 503. The second control module 206 may control the second sending module 203 to submit a display request for the notification message to the first receiving module 102 of the server 10 (block 503). The display request may carry the notification message and a message identifier. In addition, if the determining module 202 determines that the first display module 204 is in an active status, the method may advance to block 509. The first display module 204 displays the notification message (block 509). Subsequently the second control module 206 may determine if the display request has been processed by the first control module 101 of the server 10 during a first preset wait period (block 504). The first preset wait period may be timed by the first control module 101 of the server 10. The first control module 101 may determine if the display request has been processed during the first preset wait period. The first control module 101 may control the first sending module 103 to send a message if it has processed the display request during the first preset wait period to the second receiving module 205 of the electronic device 20.

If the second control module 206 determines that the display request has been processed by the first control module 101 during the first preset wait period, the method may advance to block 505. In addition, if the second control module 206 determines that the display request has not been processed by the first control module 101 during the first preset wait period, the method may advance to 509. The first control module 101 may determine if the active electronic device 30 is present in the list of active electronic devices managed thereby (block 505). For example, if the third control module 301 of the electronic device 30 determines that the second display module 303 is in an active status, the third sending module 304 of the electronic device 30 may send an active message that may carry the message identifier to the first control module 101. The first control module 101 may add the electronic device 30 into a list of active electronic devices managed thereby according to the message identifier.

If the first control module 101 determines that the active electronic device 30 is present in the list of active electronic devices managed thereby, the method may advance to block 506. In addition, if the first control module 101 determines that the active electronic device is not present in the list of active electronic devices managed thereby, the second receiving module 205 may receive a message returned by the first sending module 103 of the server 10 that the execution of the display request fails, and thus the method may advance to block 509. The first sending module 103 of the server 10 may send the notification message to the third receiving module 302 of the active electronic device 30, and thus the second display module 303 of the active electronic device 30 may display the notification message. Subsequently, the second control module 206 may determine if the user has viewed the notification message displayed by the second display module 303 of the active electronic device 30 during a second preset wait period (block 507). The second preset wait period may be timed by the third control module 301 of the electronic device 30. The third control module 301 of the electronic device 30 may determine if the user has viewed the notification message displayed by the second display module 303 during the second preset wait period. If the third control module 301 determines that the user has viewed the notification message displayed by the second display module 303 during the second preset wait period, the third control module 301 may control the third sending module 304 to send a confirmation message that the displayed notification message has been viewed by the user to the first receiving module 102 of the server 10. If the third control module 301 determines that the user has not viewed the notification message displayed by the second display module 303 during the second preset wait period, the third control module 301 may control the third sending module 304 to send a confirmation message that the notification message has been displayed by the second display module 303 to the first receiving module 102 of the server 10.

If the second control module 206 determines that the user has viewed the notification message displayed by the second display module 303 of the active electronic device 30 during a second preset wait period, the method may advance to block 508. The second receiving module 205 of the electronic device 20 may receive a confirmation message returned by the first sending module 103 of the server 10 that the notification message displayed by the second display module 303 has been viewed by the user during the second preset wait period (block 508). In addition, if the second control module 206 determines that the user has not viewed the notification message displayed by the second display module 303 of the active electronic device 30 during the second preset wait period, the method may advance to block 510. The second receiving module 205 of the electronic device 20 may receive a confirmation message returned by the first sending module 103 of the server 10 that the notification message has been displayed (block 510).

The method provided in FIG. 5 is only an example. At least some operations of the method may be carried out simultaneously, in a different order or completed omitted. The above may be implemented by means of hardware or firmware, or may be implemented through running software or computer codes stored in a memory medium (such as a CD ROM, DVD, magnetic tape, RAM, floppy disk, hard disk or magnetic optic disk) or computer codes that are originally stored in a remote memory medium or non-transient machine readable medium and downloaded through a network so as to be stored in a local memory medium, which enables the implementation of the method described herein by a general purpose computer or a dedicated processor or software stored in a memory medium using a programmable or dedicated hardware (such as ASIC or FPGA). As it is understood in the art, the computer, processor, microprocessor controller or programmable hardware comprises a memory part that can store or receive software or computer codes, for example, RAM, ROM and flash memory, etc., wherein when the computer, processor or hardware accesses and runs the software or computer codes, the software or computer codes will implement the method described herein. In addition, it should be noted that when a general purpose computer accesses the codes for implementing the processes shown herein, the operations of the codes may convert the general purpose computer to a dedicated computer for executing the processes shown herein. Any function or step provided in the accompanying drawings may be implemented by means of hardware, software or a combination of the two, and may be executed, in full or in part, within programmable commands of the computer.

In summary, the method, the server and the electronic device for synchronizing notification messages for electronic devices may facilitate gathering of notification messages such that a user can promptly receive notification messages.

Although exemplary embodiments of the present invention have been described, those skilled in the art should understand that various changes in form and details may be made without departing from the spirit and scope of the present invention defined by the appending claims and equivalents thereof.

The invention claimed is:

1. A method of synchronizing notification messages for electronic devices, the method comprising:
    receiving, via a server, a same identifier from each electronic device, of a plurality of electronic devices;
    sending, via the server, a second identifier to each electronic device, of the plurality of electronic devices, to create a set of electronic devices associated with the server by the second identifier;
    creating, via the server, a list indicating a status of each electronic device, of the plurality of electronic devices, based on a status notification sent by each electronic device;
    receiving, via the server, a display request from an electronic device, of the plurality of electronic device, when the electronic device receives a notification message and determines that the electronic device is in a standby mode, wherein the display request includes the notification message and the second identifier;
    determining, via the server, if the display request has been processed by the server during a first preset wait period;
    identifying, via the server, an active electronic device, of the plurality of electronic devices, based on the list and the display request being processed during the first preset wait period; and
    sending, via the server, the notification message to the active electronic device for display.

2. The method according to claim 1, further comprising:
    determining, via the server, that the display request has not been processed by the server during a first preset wait period; and
    sending, via the server, a message to the electronic device in the standby mode indicating that the server has not processed the display request and to cause the electronic device in the standby mode to display the notification message.

3. The method according to claim 1, further comprising:
    determining, via the server, that the active electronic device is not identified in the list; and
    sending, via the server, a message to the electronic device in the standby mode indicating that the display request has failed and to cause the electronic device in the standby mode to display the notification message.

4. The method according to claim 1, further comprising:
    determining, via the server, if a user of the active electronic device has viewed the notification message during a second preset wait period; and sending, via the server, a confirmation message to the electronic device in the standby mode indicating that the notification message has been viewed by the user during the second preset wait period.

5. The method according to claim 4, further comprising:
determining, via the server, that the notification message was displayed during the second preset wait period; and
sending, via the server, a confirmation message to the electronic device in the standby mode indicating that the notification message has been displayed by the active electronic device during the second preset wait period.

6. An electronic device, comprising:
at least one processor; and
a memory storing at least one instruction that when executed by the at least one processor causes the at least one processor to:
receive, via a server, a same identifier from each electronic device, of a plurality of electronic devices;
send, via the server, a second identifier to each electronic device, of the plurality of electronic devices, to create a set of electronic devices associated with the server by the second identifier;
create, via the server, a list indicating a status of each electronic device, of the plurality of electronic devices, based on a status notification sent by each electronic device;
receive, via the server, a display request from a requesting electronic device, of the plurality of electronic devices, when the requesting electronic device receives a notification message and determines that the requesting electronic device is in a standby mode, wherein the display request includes the notification message and the second identifier;
determine, via the server, if the display request has been processed by the server during a first preset wait period;
identify, via the server, an active electronic device, of the plurality of electronic devices, based on the list and the display request being processed during the first preset wait period; and
send, via the server, the notification message to the active electronic device for display.

7. The electronic device according to claim 6, further comprising:
a display module configured to display a message, and
wherein the memory further stores at least one instruction that when executed by the at least one processor causes the at least one processor to:
display, via the display module, the notification message if the electronic device is determined to have an active operation status.

8. The electronic device according to claim 7, wherein the memory further stores at least one instruction that when executed by the at least one processor causes the at least one processor to:
determine that the display request has not been processed by the server during the first preset wait period; and
display, via the display module, the notification message.

9. The electronic device according to claim 7, wherein the memory further stores at least one instruction that when executed by the at least one processor causes the at least one processor to:
receive, from the server, a message indicating
that execution of the display request has failed if the active device cannot be identified from the list.

10. The electronic device according to claim 7, wherein the memory further stores at least one instruction that when executed by the at least one processor causes the at least one processor to:
receive, from the server,
a confirmation message that the displayed notification message has been viewed by the user during a second preset wait period; and
determine, based on the confirmation message, that the user has viewed the displayed notification message.

11. The electronic device according to claim 10, wherein the memory further stores at least one instruction that when executed by the at least one processor causes the at least one processor to:
determine that the user has not viewed the displayed notification message based on a confirmation message that the notification message has been displayed during the second preset wait period.

12. The electronic device according to claim 6, wherein the memory further stores at least one instruction that when executed by the at least one processor causes the at least one processor to:
determine if the electronic device is an active electronic device;
send an active message, including the identifier, to the server to register the active electronic device with the server; and
receive a notification message of a standby electronic device that is registered with the server using the identifier.

13. The electronic device according to claim 12, further comprising:
a display module configured to display the notification message.

14. The electronic device according to claim 13, wherein the memory further stores at least one instruction that when executed by the at least one processor causes the at least one processor to:
time the second preset wait period and determine if a user of the electronic device has viewed the notification message displayed by the display module;
determine that the user has viewed the displayed notification message;
determine that the second preset wait period has not passed; and
send, to the server, a confirmation message that the displayed notification message has been viewed by the user.

15. The electronic device according to claim 13, wherein the memory further stores at least one instruction that when executed by the at least one processor causes the at least one processor to:
determine that the user has viewed the displayed notification message;
determine that the second preset wait period has passed; and
send, to the server, a confirmation message that the notification message has been displayed.

16. A server, comprising:
at least one processor; and
a memory storing at least one instruction that when executed by the at least one processor causes the at least one processor to:
receive, via the server, a same identifier from each electronic device, of a plurality of electronic devices;

send, via the server, a second identifier to each electronic device, of the plurality of electronic devices, to create a set of electronic devices associated with the server by the second identifier;

create, via the server, a list indicating a status of each electronic device, of the plurality of electronic devices, based on a status notification sent by each electronic device;

receive, via the server, a display request from a requesting electronic device, of the plurality of electronic devices, when the requesting electronic device receives a notification message and determines that the requesting electronic device is in a standby mode, wherein the display request includes the notification message and the second identifier;

determine, via the server, if the display request has been processed by the server during a first preset wait period;

identify, via the server, an active electronic device, of the plurality of electronic devices, based on the list and the display request being processed during the first preset wait period; and send, via the server, the notification message to the active electronic device for display.

17. The server according to claim 16, wherein the memory stores at least one instruction that when executed by the at least one processor causes the at least one processor to:

send the message identifier to plurality of electronic devices to create a set of electronic devices associated by the message identifier; and create a list indicating a status of each electronic device, of a plurality of electronic devices, based on a status notification sent by each electronic device.

* * * * *